J. FREE, Sr.
MIXER.
APPLICATION FILED FEB. 27, 1915.

1,191,170.

Patented July 18, 1916.

WITNESSES
Jas. K. McCathran
F. T. Chapman.

INVENTOR
John Free, Sr.,
BY
ATTORNEY

UNITED STATES PATENT OFFICE.

JOHN FREE, SR., OF EAST PITTSBURGH, PENNSYLVANIA.

MIXER.

1,191,170.  Specification of Letters Patent.  Patented July 18, 1916.

Application filed February 27, 1915. Serial No. 11,092.

*To all whom it may concern:*

Be it known that I, JOHN FREE, Sr., a citizen of the United States, residing at East Pittsburgh, in the county of Allegheny and State of Pennsylvania, have invented a new and useful Mixer, of which the following is a specification.

This invention has reference to mixers, and its object is to provide a machine whereby coloring matter may be intimately mixed with oleomargarin, but it is to be understood that while such is the prime purpose of the present invention, the latter may be used for mixing other materials, since the device may be used, for instance, as a churn, or to mix vegetables, paint, etc., or for various other like purposes.

The invention comprises a suitable base which may or may not be provided with a side extension to better hold it, and on this base there is mounted a receptacle capable of being temporarily secured to the base by catches brought into holding relation by a rotative movement of the receptacle. There is also provided a cover having means for securing it to the receptacle, so that both may be moved about an uprigh axis simultaneously for a short distance and other holding means are provided whereby under the conditions last named the cover engages catch members to thereby hold both the cover and the receptacle to the base.

Within the receptacle is an upright series of arms or mixing members in spaced and substantially parallel relation, and there is also located a rotatable shaft extending through the cover and there provided with a manipulating handle, and this shaft carries a spirally arranged series of radial arms suitably spaced to pass between the upright series of arms radially arranged within the receptacle, but the rotatable arms move through the upright series of arms in progressive order.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 1:
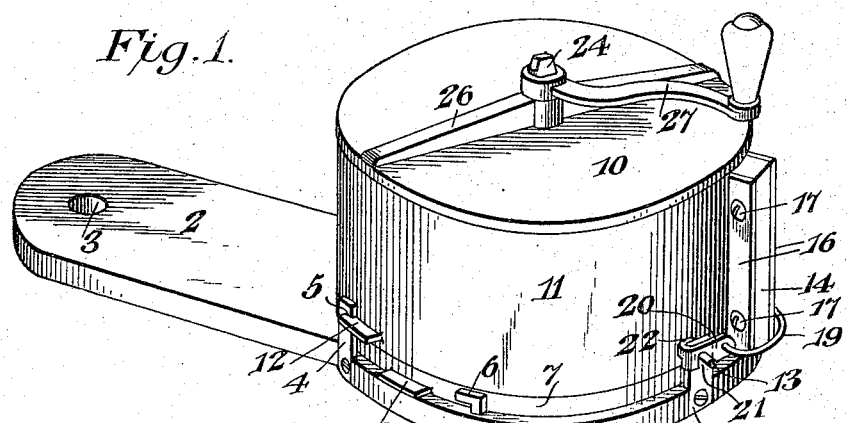
Figure 2:
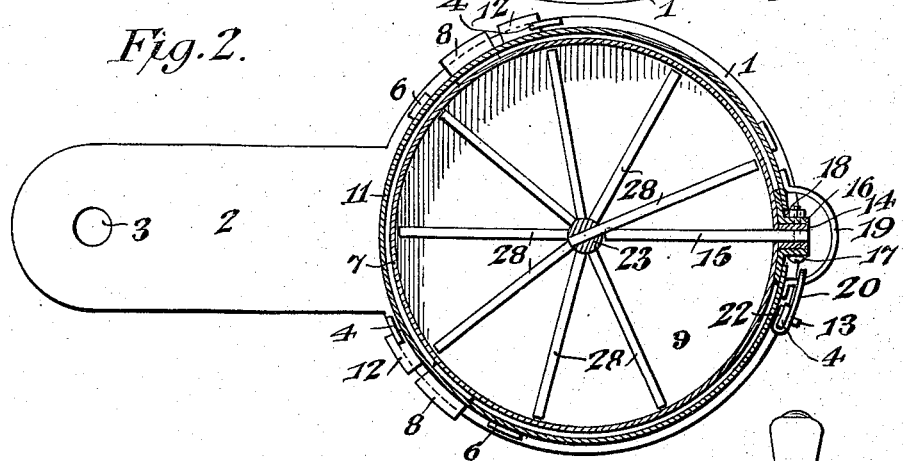
Figure 3:
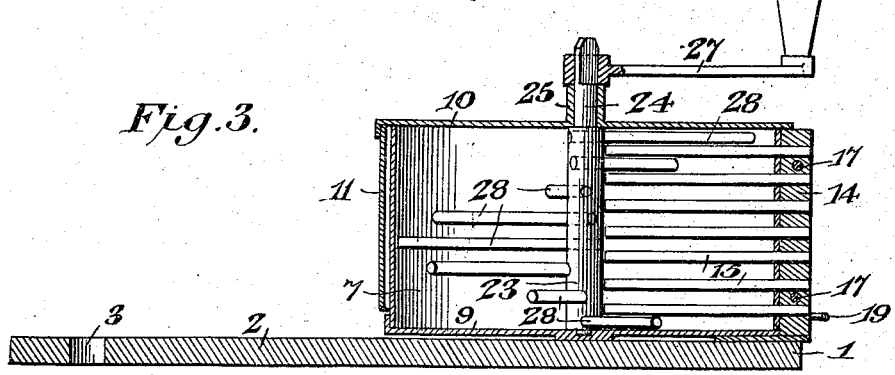

In the drawings:—Figure 1 is a perspective view of the mixing machine of the present invention. Fig. 2 is a cross-section taken just below the top of the cover. Fig. 3 is a vertical diametric section.

Referring to the drawings, there is shown a base board 1 provided with a radial offset extension 2 having a perforation 3 near the end remote from the base board 1. Since the device may be readily used for mixing relatively small batches of material, it need not under such circumstances be made of large size, in which case the offset 2 provides a convenient means whereby the base 1 can be held against movement, while the mixer is in operation, and the perforation 3 provides a convenient means whereby the entire device may be hung up. Of course, in larger structures the offset 2 is omitted and the whole structure may be permanently mounted.

Arranged at intervals about the marginal portion of the base 1 are upright catch members 4 having side entering notches 5 near their upper ends. In the particular structure shown there are three of these uprights 4 disposed about the circumference of the base 1, which in the particular instance is shown as rounded. Between the uprights 4 are upstanding hooks or catch members 6 each rising to a less height than the uprights 4, and these hooks 6 are also disposed about the peripheral portion of the base 1. It is not material that the hooks and uprights have any particular relation one to another, but the uprights may approximate a one hundred and twenty degree relation and the hooks may likewise approximate such relation, but any strict conformity to such relation is not demanded.

Adapted to be supported by the base 1 is a cylindrical receptacle 7 which at intervals corresponding to the spacing of the hooks 6 has plates 8 on the bottom 9 of the receptacle. These plates project radially from the side wall of the receptacle for a sufficient distance to move under the overhangs of the hooks 6, so that upon an appropriate rotation of the receptacle the plates 8 will each engage under the overhang portion of a respective hook 6. Under these conditions the receptacle is temporarily locked to the base 1, but on a rotation of the receptacle for a few degrees away from the hooks it becomes unlocked and may be removed from the base.

Adapted to the receptacle is a cover member 10 having cylindrical side walls 11 of sufficient diameter to fit over the receptacle in closing relation thereto and reach nearly to the bottom of the receptacle. Projecting from the wall 11 of the receptacle near the bottom end are lugs 12, 13, the lug 13 being in the form of a pin, while the other lugs 12 are circumferentially elongated, although pins would answer the purpose. These lugs are so spaced about the side walls of the cover member that they will simultaneously engage the notches 5 of the uprights 4 when the cover is turned in the appropriate direction. The overhang portion of the hooks 6 all project in one direction, while the notches 5 of the uprights 4 are all open in the other direction. If the cover member be assumed to be fast to the receptacle 7, then when it is turned in one direction the receptacle participates in such turning movement and ultimately the lugs 12 and 13 are brought into locking relation to the respective uprights 4, while the plates 8 are moved out of locking relation to the hooks 6 and when the parts are moved in the contrary direction the receptacle 7 is locked to the hooks 6, while the cover 10 is unlocked from the uprights 4.

Projecting from one side of the receptacle is an upright strip 14 which may be made either of wood or metal, but is usually formed of some soft metal and carried by this strip 14 is a series of arms 15 each of which may be formed of an appropriate length of metallic rod, preferably though not necessarily of round cross-section. The strip, 14, especially if of soft metal, is made fast to the side wall of the receptacle 7 by elongated brackets 16 soldered or otherwise secured to the receptacle and the strip 14 is made fast to these brackets by screws or bolts 17.

The side wall 11 of the cover member 10 is formed with an elongated slot 18 adapted to receive the strips 14 with its brackets 16, and the lower portions of the wall 11 on opposite sides of the slot are joined by a yoke 19, whereby such end of the cover member is not weakened because of the presence of the slot. The yoke 19 provides a convenient pivotal support for one end of a latch 20, the other end of which is formed with a side notch 21 and a return tongue 22. When the pin 13 is lodged in the corresponding upright latch member 4 and the cover 10 is applied to the receptacle 7, the latch member 20 may be turned on the yoke 19 as a pivot, in which case the notch 21 will pass over the pin 13 and the tongue 22 will engage behind the upright 4. At the same time the lock members 12 and 13 are lodged in the notches 5 of the respective uprights 4, so that the cover member is at this time locked to the base 1 and being in inclosing relation to the receptacle likewise locks the receptacle to the base 1.

Stepped at the lower end in the base 1 is an upright shaft 23 having a reduced upper end 24 extending through a boss 25 rising centrally from the top of the cover, and this boss and the top of the cover are stiffened by radial ribs 26 extending oppositely from the boss to the margin of the cover. These ribs provide a convenient means for turning the cover when it is desired to lock it to the base or unlock it therefrom. The shaft extension 24 rises above the boss 25 and is there shaped to receive a manipulating crank 27.

Projecting radially from the shaft 23 is a series of arms 28 arranged in spiral order about the shaft so that these arms project on progressively different radial lines from the shaft when considered in the direction of the length of the shaft. The arms 15 are spaced apart and the arms 28 are so located that the arms 28 on the rotation of the shaft will pass between respective adjacent ones of the arms 28 and in the operative structure the spacing of the arms 15 and the thickness of the arms 28 are so related that the arms 28 will just pass through the spaces between the arms 15 without quite touching them. Moreover, the arms 15 extend toward the shaft 23, so that their free ends are in very close relation to the shaft without actually touching it.

If, now, a quantity of oleomargarin be placed within the receptacle 7 together with a suitable quantity of coloring matter, and the shaft and cover be applied, the mixing is performed by rotating the shaft and different portions of the mass are forced between the arms 15 by the movement of the arms 28. By the spiral arrangement of the arms 28 about the shaft 23 a power necessary to bring about the mixing is greatly reduced because at no one time is more than one arm 28 passing between two arms 15, but the entire depth of the mass is subjected to the mixing action of the arms 15 and 28. This mixing action, however, is a progressive action, thus thoroughly agitating the contents and disturbing the entire mass so that despite the rather thick consistency of the material the mixing is very thoroughly performed without, however, the exertion of any very great force at any time, and this mixing may be performed in a relatively short time without undue fatigue.

The mixer is particularly adapted for the proper mixing of rather thick or viscous material, and because of the multi armed shaft and stationary comb through which the arms of the shaft are progressively forced, no part of the mass escapes the mixing action, and the resultant mixture is a product through which the ingredients are very evenly distributed.

When it is desired to remove the contents of the mixer, and to cleanse it, the cover and mixing shaft are both readily removed without removing the receptacle from the base, and the latter is then readily removable without the necessity of undoing any special fastening devices. Both the cover and the receptacle are removable from the base by a simple rotative movement, and both are as easily locked to the base against accidental displacement when the parts are in operation.

What is claimed is:—

1. A mixer comprising a receptacle provided with a mixing member interior thereto and fixed to one side of the receptacle with a portion projecting to the exterior of the receptacle, a cover member provided with an elongated slot on one side for the passage therethrough of that portion of the mixing member in the receptacle projecting to the outside of the latter, and a mixing member adapted to the interior of the receptacle for co-action with the first-named mixing member and extending through the cover member.

2. A mixer comprising a receptacle, a cover member therefor, mixing members within the receptacle with one fixed to the receptacle and the other rotatable with respect to the first-named member, a support for the receptacle, locking means on the support, on the receptacle and on the cover, with the locking means on the receptacle and cover movable by rotative movements of the receptacle and cover about their longitudinal axis into and out of engagement with the locking means on the support.

3. A mixer comprising a cylindrical receptacle, a support on which the receptacle is rotatable about its longitudinal axis for a limited distance, a cover for the receptacle, mixing members within the receptacle, and coacting locking members on the support and on both the receptacle and cover for engagement of the locking members on the support and receptacle when the latter is turned in one direction and engagement with the locking members on the support and cover when the receptacle is turned in the other direction.

4. A mixer comprising a basic member, a cylindrical receptacle adapted thereto, a cylindrical cover on the receptacle of an axial length to reach close to the basic member, mixing means within the receptacle, and coacting locking means on the basic member, cover and the receptacle and movable into and out of engagement by rotative movements of the receptacle and cover.

5. A mixer comprising a basic member or support, a cylindrical receptacle adapted to said basic member or support, a cover member telescoping on the receptacle, latch means on the receptacle, other latch means on the cover, and latch means on the basic member in coactive relation to either the latch means on the receptacle or the latch means on the cover in accordance with the direction of movement of the receptacle.

6. A mixer comprising a basic member, a cylindrical receptacle adapted to said basic member, mixing devices in the receptacle, a cover member for the receptacle, coacting latch means on the cover and basic member movable into and out of engagement by rotation of the cover, other latch means on the receptacle in coactive relation to the latch means on the basic member and movable into and out of engagement by rotation of the receptacle, and latch means on the cover in coactive relation to certain of the latch means on the basic member for locking the cover and receptacle to the basic member.

7. A mixer comprising a basic member, a cylindrical receptacle adapted thereto and having an exterior longitudinal projecting portion and interior mixing members, coacting latch members on the basic member and receptacle movable into and out of engagement by limited rotative movements of the receptacle, a cover member for the receptacle provided with a cylindrical portion telescoping over the receptacle, and latch devices on the cover in coactive relation to the latch devices of the basic member and movable into engagement with the latch devices of the basic member by a limited movement of the cover and receptacle in the opposite direction to the first-named movement of the receptacle, and said cover member being arranged to engage the longitudinal projecting portion on the exterior of the receptacle to hold the cover and receptacle together against rotative movements one on the other.

In testimony, that I claim the foregoing as my own, I have hereto affixed my signature in the presence of two witnesses.

JOHN FREE, Sr.

Witnesses:
 FRANK ARTHURS,
 LEO O. ROURKE.

Copies of this patent may be obtained for five cents each, by addressing the "Commissioner of Patents, Washington, D. C."